United States Patent [19]

Hermes

[11] 3,771,949

[45] Nov. 13, 1973

[54] PRETREATMENT AND DYEING OF SHAPED ARTICLES DERIVED FROM WHOLLY AROMATIC POLYAMIDES

[75] Inventor: Julius Hermes, Martinsville, Va.

[73] Assignee: Martin Processing Company, Incorporated, Martinsville, Va.

[22] Filed: Nov. 29, 1971

[21] Appl. No.: 203,010

[52] U.S. Cl. .............................. 8/4, 8/173, 8/178 R
[51] Int. Cl. .......................... D06p 5/04, D06p 3/24
[58] Field of Search .......................... 8/178 R, 4, 173

[56] References Cited
UNITED STATES PATENTS

| | | | |
|---|---|---|---|
| 2,828,180 | 3/1958 | Sertorio | 8/62 |
| 3,510,243 | 5/1970 | Seuret et al. | 8/174 |
| 3,591,327 | 7/1971 | Matsuda et al. | 8/178 |
| 3,606,988 | 9/1971 | Walz et al. | 8/173 X |
| 3,674,420 | 7/1972 | Sapers | 8/173 |
| 3,695,992 | 10/1972 | Moulds | 161/178 |

Primary Examiner—Leon D. Rosdol
Assistant Examiner—T. J. Herbert, Jr.
Attorney—Richard K. Stevens et al.

[57] ABSTRACT

Processes are disclosed for the conversion of thermally stable shaped articles derived from wholly aromatic polyamides into level dyeing, deeper dyeing products having improved resistance to discoloration by sunlight or ultraviolet radiation. The processes involve treatment of the shaped articles at elevated temperatures at atmospheric pressure under carefully controlled conditions, and include a pretreatment or conditioning treatment carried in a hot bath of a high boiling organic liquid followed by dyeing the shaped articles in another hot bath cotaining a conventional organic dyestuff dissolved or dispersed in a high boiling organic liquid which may be the same or a different high boiling organic liquid. High boiling glycols, glycol ethers, solvents or solvent blends are especially suitable. Additionally, the hot dyebath preferably includes a further additive to minimize the effect of harmful radiation. The processes may be carried out batchwise or continuously, and may be employed for the treatment of the shaped article in the form of continuous filament yarn, staple yarn, tow, fabric, etc. Special features of the invention are the relatively short time of treatment (especially in the case of continuous operation) thus providing a commercially feasible process and the avoidance of the need for employing solid organic or inorganic pigments for coloring the thermally stable shaped articles.

4 Claims, No Drawings

PRETREATMENT AND DYEING OF SHAPED ARTICLES DERIVED FROM WHOLLY AROMATIC POLYAMIDES

The present invention relates to a method for treating or pretreating shaped articles derived from wholly aromatic polyamides to render them easily dyeable by conventional organic dye-stuffs at ordinary atmospheric pressure, a method for dyeing such shaped articles with conventional organic dyestuffs, and a method combining both the pretreating and the dyeing. Also included is the feature of incorporating additives that will protect the dyed products from the effect of harmful radiation (e.g., sunlight and/or ultraviolet radiation).

BACKGROUND OF THE INVENTION

Considerable research effort has been directed in recent years toward the preparation of high-temperature-resistant wholly aromatic polyamides for use in the form of fibers, yarns, fabrics, paper and films. These polymers have been found to be superior to natural and many oher synthetic polymers in retention of desirable properties at elevated temperatures on long-term exposure.

However, wholly aromatic polyamides, in general, are highly crystalline and have what might be called a non-uniform heat history. As a result, they are not considered dyeable. Particularly, the filament yarns are not even merged for dye-ability. See, e.g., DuPont's Nylon Bulletin N-246, May 1971. This is primarily due to the nature of the manufacturing processes used in manufacture of the wholly aromatic polyamide materials, wherein the filaments after extrusion are subjected to dry heat. The end-to-end non-uniformity in dry heat application causes structural variations in the filament which in turn results in the undesirable dyeing variations.

Recent efforts to dye wholly aromatic polyamides have primarily involved aqueous pressure dyeings. However, all of these processes are exclusively batch operations requiring up to 2 hours of exposure time. Even then very unlevel (i.e., streaky) dyeing is obtained because of the varying heat history, particularly for those products consisting of filament yarns.

The process of the present invention involves a special pretreatment (preferably but not necessarily continuous) and a special dyeing method (preferably but not necessarily continuous) for shaped articles derived from wholly aromatic polyamides. This is accomplished at atmospheric pressure by the use of glycol or glycol ether fluids and lubricants, solvents and solvent blends. The present invention also includes the combination of the pretreatment and the dyeing.

Many wholly aromatic polyamides discolor when exposed to intense sunlight or ultraviolet radiation. Considerable improvement can be achieved by the incorporation of ultraviolet screeners, color stabilizers, antioxidants and other chemicals which reduce the effect of harmful radiation. Accordingly, this represents still another feature of this invention.

SUMMARY OF THE INVENTION

This invention relates to processes (preferably but not necessarily continuous) for pretreatment and/or subsequent dyeing of shaped articles derived from high-temperature-resistant wholly aromatic polyamides.

It has now been found that when thermally stable wholly aromatic polyamide compositions in the form of fibers, yarns, fabrics, papers, films (or other useful shaped articles having a high surface-to-volume ratio) are first pretreated with glycol or glycol ether fluid and lubricants, and then subsequently treated with solvents and solvent blends containing dye, ultraviolet screeners, color stabilizers, antioxidants, etc., at atmospheric pressure at high temperatures under carefully controlled conditions, one thereby obtains level, deep, fast shades.

The optimum time-temperature conditions of both pretreatment and dyeing are somewhat critical in that they are dependent to some extent on the polymer composition. If treated below a given temperature for a given polymer, the desired dyeing will not occur giving streaky (unlevel) dyeing, or it occurs at too slow a rate to be practical; if treated at too high a temperature or for too long a time in the optimum temperature range, the products, although dyed, may become embrittled and lose some of their desirable physical properties.

Satisfactory time and temperature conditions for most wholly aromatic polyamides involve raising the temperature of the heating bath to about 140° to 500°F, and when reaching the desired temperature causing exposure thereof to the treating bath for less than 1 minute in the case of continuous operation up to about two hours for batchwise operation in order to complete the treatment. Exposure may also take place during heating of the bath, although somewhat less desirably.

Accordingly, it is an object of this invention to provide a pretreatment process for the preparation of articles of thermally stable wholly aromatic polyamides having an improved dyeability necessary for obtaining level, deep shades.

Another object of the invention is to provide a process for the level dyeing of articles of thermally stable wholly aromatic polyamides formerly not considered dyeable or uniformly dyeable.

Still another object of the invention is to provide a process for the preparation of articles of thermally stable wholly aromatic polyamides having improved durability or resistance to sunlight or ultraviolet radiation.

Finally, another object of the invention is to provide a process for incorporating antioxidants and other chemical preservatives when manufacturing food-packaging materials from thermally stable wholly aromatic polyamides.

Other objects of the invention will become apparent from a consideration of the following description.

The term "wholly aromatic polyamide" as used herein is to be understood as meaning a high molecular weight synthetic organic polyamide made by the condensation or reaction of aromatic or essentially aromatic monomeric starting material or materials. Thus, in the case of aromatic diamines and aromatic diacids (or derivatives of such acids), the polymer repeating unit structure of the resulting aromatic polyamide in one instance may be illustrated by the following structural formula:

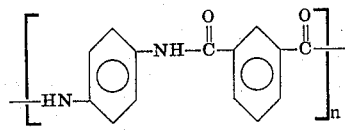

Commercially available examples of such polyamides are the varios DuPont "Nomex" high temperature resistant nylons. These include Nomex 450, a staple fiber or tow (see DuPont Bulletins N-236 of October 1969, N-245 of March 1971 and N-249 of June 1971); Nomex 430, a continuous filament yarn (see DuPont Bulletin N-246 of May 1971); and a modified Nomex E-12C in staple carpet fiber form.

However, other kinds of suitable wholly aromatic polyamides are known in the literature, and the present invention is useful for all such other kinds as well, it being understood that the wholly aromatic polyamides per se form no part of the present invention.

For a convenient source in the literature of further detailed information on the chemistry and the nature of wholly aromatic polyamides to which this invention is applicable, those interested are referred to Mark & Gaylord, "Encyclopedia of Polymer Science and Technology," Vol. 10, 1969, pages 583-597. Still further information can be found in Chapter 6 entitled "New Linear Polyamides" of a book entitled "New Linear Polymers," by Lee, Stoffey & Neville, 1967, pages 129-169. For brevity, the relevant contents of the pages cited are to be regarded as incorporated herein by reference.

The high boiling organic liquids employed for pretreatment in accordance with this invention are the glycols and glycol ethers such as ethylene glycol, propylene glycol, diethylene glycol, dipropylene glycol, triethylene glycol, tetraethylene glycol, and the mono-alkyl and di-alkyl ethers of these glycols such as the mono-ethyl ether or the di-methyl ether of any of the foregoing glycols. Preferably, the glycols and glycol ethers are employed in substantially anhydrous form.

The glycols or glycol ethers or solvents or solvent blends may be employed over a rather wide range of conditions such as temperature and time of treatment.

For example, temperatures as low as about 140°F have been employed as well as temperatures at or near the boiling point of the treating bath. A preferred maximum is about 500°F.

Times of treatment may be varied from as low as about 5 seconds to as high as 60 seconds in the case of continuous operation. In the case of the less preferred batch operation (i.e., less preferred only because less desirable from the commercial point of view) longer times, up to 2 hours are permissible.

Generally speaking, it is preferable to employ a substantially inverse ratio between the temperature and the time of treatment; i.e., desirable results can be obtained with shorter times of treatment the higher the temperature, and this is one of the especially desirable features of this invention from the commercial point of view.

While those skilled in the art will appreciate that rather wide variations in the treating conditions whose limits have been mentioned above are permissible, at the same time for any given wholly aromatic polyamide starting material some slight latitude must be accorded the skilled worker in selecting the optimum conditions within those broad limits that will give him the satisfactory dyeing that is a feature of this invention.

Any conventional organic dyestuffs (cationic dyes are preferable) which are dispersible in the solvents and/or solvent blends may be employed, depending on the color and shade desired in the final dyed product.

Likewise, conventional dye assistants and solvents may be employed in the dye baths. Among these may be mentioned the following solvents alone and/or blends of two or more such solvents: methyl ethyl ketone, benzaldehyde, tetrahydrothiophene 1—1 dioxide, dimethyl sulfoxide, benzyl alcohol, glycols and glycol ethers, dimethyl phthalate, dimethyl formamide, furfuryl alcohol, dimethyl acetamide, dibenzyl ether, diacetone alcohol, etc.

The invention may be still further illustrated by the following detailed working examples which however are not intended to be limiting on the scope of the invention.

EXAMPLE I

Pretreatment of wholly aromatic polyamide continuous filament yarn fabric with diethylene glycol, and subsequent dyeing with a solution of ethylene glycol and methyl ethyl ketone in dimethyl sulfoxide with the simultaneous application of ultraviolet screener:

Samples of wholly aromatic polyamide woven filament yarn fabric (7 oz. per square yard, two-ply, 200 denier yarn, both warp and fill) were pretreated as follows:

Pretreatment bath of 100.00 percent diethylene glycol at 190°C at atmospheric pressure.

The fabric was treated for 20 seconds, after which the samples were washed in clear water, dried and then dyed as follows:

The dye-bath, at 105°C. and at atmospheric pressure, consisted of the following ingredients:

- 3.0 percent (by vol.) ethylene glycol
- 10.0 percent (by vol.) methyl ethyl ketone
- 87.0 percent (by vol.) dimethyl sulfoxide
- 10.0 grams per liter basic green, Color Index No. 6
- 10.0 grams per liter "Uvinul" D-49 (benzophenone derivative by General Aniline & Film Corp.)

The fabric samples were dyed for 40 seconds, after which the samples were washed in clear water, dried and then an after scour treatment was given as follows:

The scour bath, at 80°C, comprised 5.0 grams/per liter of Hydraphthal (self-emulsified solvent blend from DuPont).

The fabric samples were scoured for 60 seconds, after which the samples were washed in clear water, and then flash-dried at 200°C.

TABLE I

| Sample | Dyeing Levelness | Light fastness* 40 hours exposure in carbon arc Fade-Ometer |
|---|---|---|
| A. Present Invention | Excellent | 7 |
| B. Conventional aqueous pressure dyeing, as described in DuPont Bulletin N-249 of June 1971 | Poor | 1 |

* American Association of Textile Chemist & Colorist (AATCC) 8 = least break; 1 = maximum break The improvement in dyeing uniformity and sunlight durability of the fabric treated according to the present invention just indicated is apparent from the above results.

EXAMPLE II

Pretreatment of wholly aromatic polyamide staple (2.0 denier per filament, 2 in.) spun yarn fabric with tetraethylene glycol and subsequent dyeing with a solution of ethylene glycol and methyl ethyl ketone in dimethyl sulfoxide with the simultaneous application of ultraviolet screener:

Samples of wholly aromatic polyamide woven spun yarn fabric (6 oz. per square yard) were pretreated for 20 seconds with tetraethylene glycol at atmospheric pressure. The samples were treated under various conditions of temperature after which the samples were washed in clear water, dried and then dyed as follows:

The dye-bath, at 100°C. and atmospheric pressure, was made up as follows:

5.0 percent (by vol.) ethylene glycol
15.0 percent (by vol.) methyl ethyl ketone
80.0 percent (by vol.) dimethyl sulfoxide
10.0 grams per liter Basic Green, Color Index No. 6
10.0 grams per liter "Uvinul" D–49

The fabric samples were dyed for 40 seconds, after which the samples were washed in clear water, dried and then an after scour treatment was given as described in Example I.

The results obtained are shown in Table II.

TABLE II

| Sample | Pretreatment Temperature | Dyeing Levelness | Light fastness* 40 hrs. exposure in carbonare Fade-Ometer |
|---|---|---|---|
| A. Present Invention | | | |
| 1 | 150°C | Fair | 4 |
| 2 | 180°C | Excellent | 6 |
| 3 | 230°C | Good | 5 |
| B. Conventional aqueous pressure dyeing as described in DuPont Bulletin N–249 of June 1971 | untreated | Poor | 1 |

*AATCC — 8 = least break; 1 = maximum break

All of the above pretreated samples were adjudged to be better in dyeing uniformity and lightfastness than for untreated samples. The improvement in dyeing levelness and sunlight durability resulting from the method of the present invention is apparent from the above results.

EXAMPLE III

Pretreatment of wholly aromatic polyamide staple (2 in., 2.0 denier per filament) spun yarn fabric with diethylene glycol and subsequent treatment with various blends of ethylene glycol, dimethyl acetamide, methyl ethyl ketone, dimethyl sulfoxide, and dimethyl formamide with the simultaneous application of ultraviolet screeners:

Samples of wholly aromatic polyamide woven spun yarn fabric (8 oz. per square yard) were pretreated with diethylene glycol as described in Example I and then treated as follows:

The fabric samples were treated for 40 seconds, after which the samples were washed in clear water, dried and then an after scour treatment was given as described in Example I.

The results obtained are shown in Table IIIB.

TABLE IIIB

| Sample No. | Lightfastness* 40 hours exposure in carbon-arc Fade-Ometer |
|---|---|
| 1 | 4 |
| 2 | 5 |
| 3 | 6 |
| 4 | 7 |
| 5 | 4 |
| 6 | 4 |
| 7 (untreated) | 1 |

*American Association of Textile Chemist and Colorist — AATCC 8 = least break; 1 = maximum break The above results show that synergistic effects are obtained by treatment with various solvent blends. It is apparent from the above results that improved lightfastness is obtained by treatment with solvent blends as compared with that obtained by using a single solvent by itself. This is of practical commercial importance.

EXAMPLE IV

Pretreatment of wholly aromatic polyamide staple (2 in., 2.0 denier per filament) yarn fabric with various glycols, and subsequent treatment with a solution of ethylene glycol in dimethyl acetamide with the simultaneous application of ultraviolet screener:

Samples of wholly aromatic polyamide woven spun yarn fabric (8 oz. per square yard) were pretreated as shown below in Table IV.

The fabric samples were treated at a temperature of 190°C for 20 seconds, after which the samples were washed in clear water, dried and then treated as follows:

A bath, at 130°C. at atmospheric pressure, was made up as follows:

5.0 percent (by vol.) ethylene glycol
95.0 percent (by vol.) dimethyl acetamide
10.0 grams per liter Tinuvin 327

The samples were treated for 20 seconds, after which samples were washed in clear water, dried and then an after scour treatment was given as described above in Example I.

The results obtained are shown in Table IV.

TABLE IV

| Sample No. | Pretreatment Fluid | Lightfastness* 40 hours in carbon arc Fade-Ometer |
|---|---|---|
| 1 | ethylene glycol | 5 |
| 2 | diethylene glycol | 7 |
| 3 | triethylene glycol | 6 |

TABLE IIIA

| Sample number | Percent by volume | | | | | Ultraviolet screener, 10.0 g./liter | Antioxidant, 10.0 g./liter | Temperature,° C |
|---|---|---|---|---|---|---|---|---|
| | Ethylene glycol | Methyl ethyl ketone | Dimethyl acetamide | Dimethyl sulfoxide | Dimethyl formamide | | | |
| 1 | 17.0 | | | 83.0 | | Uvinul D-49 | | 130 |
| 2 | 17.0 | | 17.0 | 66.0 | | do | | 130 |
| 3 | | 15.0 | | | 80.0 | do | | 100 |
| 4 | 5.0 | 15.0 | | | 80.0 | do | Ionol C.P.² | 100 |
| 5 | 17.0 | | | 83.0 | | Tinuvin 327 ¹ | | 130 |
| 6 | 17.0 | | 17.0 | 66.0 | | do | | 130 |

¹ Susbtituted benzotriazole made by Geigy Dyestuffs.
² Made by Shell Chemical Co.

| | | |
|---|---|---|
| 4 | tetraethylene glycol | 4 |
| 5 | Ucon lubricant (polyalkylene glycols and derivatives made by Union Carbide Chemicals & Plastics | 4 |
| 6 (untreated) | | 1 |

*AATCC 8 = least break; 1 = maximum break

The above results show the improvement obtained in lightfastness by pretreatment with various glycol fluids.

EXAMPLE V

Pretreatment of wholly aromatic polyamide tow with diethylene glycol, and subsequent dyeing with a solution of ethylene glycol in dimethyl acetamide, dimethyl sulfoxide and methyl ethyl ketone with the simultaneous application of an ultraviolet screener:

Samples of 120,000 denier wholly aromatic polyamide tow (2.0 denier per filament) was pretreated with diethylene glycol as described above in Example I, after which samples were dyed as shown in Table V.

TABLE V

| | | Percent by volume | | | |
|---|---|---|---|---|---|
| Sample number | Temp., °C. | Ethylene glycol | Dimethyl acetamide | Dimethyl sulfoxide | Methyl ethyl ketone |
| 1 | 130 | 25 | | 75 | |
| 2 | 130 | 5 | 95 | | |
| 3 | 130 | 17 | 17 | | |
| 4 | 100 | 5 | | 80 | 15 |
| 5 | 100 | 5 | | 65 | 30 |

The tow samples were dyed for 40 seconds with simultaneous application of Tinuvin 327 (10 gm/liter) and then an after scour treatment was given as described above in Example I.

Good level dyeing was obtained in this manner.

EXAMPLE VI

Pretreatment of wholly aromatic polyamide staple (10.0 denier per filament) spun carpet yarn with diethylene glycol, and subsequent dyeing with a solution of ethylene glycol in dimethyl acetamide with the simultaneous application of ultraviolet screener:

Samples of wholly aromatic polyamide spun carpet yarn (2/1 cotton count) were pretreated with diethylene glycol as described above in Example I, and then dyed as follows:

A dye-bath, at 130°C. at atmospheric pressure, was made up as follows:
  50.0 percent (by volume) ethylene glycol
  48.0 percent (by volume) dimethyl acetamide
  2.0 percent (by volume) citric acid
  2.0 grams per liter Basic Orange, Color Index No. 22
  8.0 grams per liter Tinuvin 327

The yarn samples were dyed for 10 seconds, and then an after scour treatment was given as described above in Example I. Good level dyeing was obtained.

EXAMPLE VII

Pretreatment of wholly aromatic polyamide staple spun yarn fabric with triethylene glycol and subsequent dyeing with a solution of tetrahydrothiophene 1—1 dioxide in dimethyl sulfoxide:

Samples of wholly aromatic polyamide woven spun yarn fabric (8 oz. per square yard) were pretreated as follows:

The pretreatment bath, at 190°C. and atmospheric pressure, consisted of 100.0 percent triethylene glycol.

The fabric samples were treated therein for 20 seconds, after which the samples were washed in clear water, dried and then dyed in a dyebath made up as follows:
  50.0 percent (by volume) tetrahydrothiophene 1—1 dioxide
  50.0 percent (by volume) dimethyl sulfoxide
  8.0 grams per liter Basic Red, Color Index No. 29

The fabric samples were dyed for 40 seconds, and then an after scour treatment was given as described above in Example I.

The results are shown in Table VII.

TABLE VII

| Sample | Dyeing Levelness |
|---|---|
| A. Present Invention | Excellent |
| B. Conventional aqueous pressure dyeing as described in DuPont Bulletin N-249 of June 1971 | Poor |

EXAMPLE VIII

Pretreatment of wholly aromatic polyamide continuous filament yarn fabric with tetraethylene glycol, and subsequent dyeing with a solution of methyl ethyl ketone in dimethyl formamide with the simultaneous application of ultraviolet screener:

Samples of wholly aromatic polyamide woven filament yarn fabric (1 oz. per square yard, two-ply 200 denier yarn, both warp and fill) were pretreated with tetraethylene glycol as described above in Example II, and then dyed as follows:

The dye-bath, at 125°C. and atmospheric pressure, was made up as follows:
  10.0 percent (by vol.) methyl ethyl ketone
  90.0 percent (by vol.) dimethyl formamide
  2.5 percent grams per liter Basic Blue, Color Index No. 54
  10.0 grams per liter Uvinul D–49.

The fabric samples were dyed for 60 seconds, and then an after scour treatment was given as described above in Example I.

The results are shown in Table VIII.

TABLE VIII

| Sample | Dyeing Levelness | Lightfastness* 40 hours exposure in carbon arc Fade-Ometer |
|---|---|---|
| A. Present Invention | Excellent | 7 |
| B. Conventional aqueous pressure dyeing as described in DuPont Bulletin N-249 of June 1971 | Poor | 1 |

*AATCC Scale — 8 = least break, 1 = maximum break

EXAMPLE IX

Pretreatment of wholly aromatic polyamide staple (2.0 denier per filament) spun yarn with triethylene glycol, and subsequent dyeing with a solution of methyl ethyl ketone in tetrahydrothiophene 1—1 dioxide:

Samples of wholly aromatic polyamide woven spun yarn fabric (6 oz. per square yard) were pretreated with triethylene glycol as described above in Example VII, and then dyed as follows:

The dye-bath, at 130°F. and atmospheric pressure, was made as follows:
  30.0 percent (by vol.) methyl ethyl ketone
  70.0 percent (by vol.) tetrahydrothiophene 1-1 dioxide 8.0 grams per liter Basic Yellow, Color Index No. 28.

The fabric samples were dyed for 40 seconds, and then an after scour treatment was given as described above in Example I. Good level dyeing was obtained.

EXAMPLE X

Pretreatment of wholly aromatic polyamide paper with diethylene glycol, and subsequent dyeing with a solution of ethylene glycol in dimethyl sulfoxide.

Samples of wholly aromatic polyamide paper (5.0 mil) were pretreated with diethylene glycol as described above in Example I, and then dyed as follows:

The dye-bath, at 130°C and atmospheric pressure, was made up as follows:

30.0 percent (by vol.) ethylene glycol
70.0 percent (by vol.) dimethyl sulfoxide
8.0 percent grams per liter Basic Blue, Color Index No. 54.

The paper samples were dyed for 40 seconds, and then an after scour treatment was given as described above in Example I. Good even dyeing was obtained.

EXAMPLE XI

Pretreatment of wholly aromatic polyamide paper with triethylene glycol, and subsequent dyeing with various blends of ethylene glycol, dimethyl acetamide, methyl ethyl ketone, dimethyl sulfoxide, and dimethyl formamide with the simultaneous application of ultraviolet screeners:

Samples of wholly aromatic polyamide paper (2.0 mil) were pretreated with triethylene glycol as described above in Example 8, and then dyed as follows:

TABLE XI

| Sample number | Temp., °C | Percent volume | | | | | Ultraviolet screener, 10.0 gm./liter |
|---|---|---|---|---|---|---|---|
| | | Ethylene glycol | Methyl ethyl ketone | Dimethyl acetamide | Dimethyl sulfoxide | Dimethyl formamide | |
| 1 | 130 | 20.0 | | 20.0 | 60.0 | | Uvinul D-49 |
| 2 | 130 | 20.0 | | | 80.0 | | Do. |
| 3 | 100 | 5.0 | 15.0 | | | 80.0 | Do. |
| 4 | 100 | 5.0 | 30.0 | | 65.0 | | Do. |
| 5 | 100 | 5.0 | 15.0 | | | 80.0 | Do. |
| 6 | 130 | 20.0 | | | 80.0 | | Timuvin 321 |
| 7 | 130 | 20.0 | | 20.0 | 60.0 | | Do. |

The paper samples were dyed using Basic Blue, Color Index No. 54 (10.0 grams per liter) for 40 seconds, and then an after scour treatment was given as described above in Example I.

Well dyed paper products were obtained.

What is claimed is:

1. A process for the pretreatment of thermally stable shaped articles derived from wholly aromatic polyamides for the purpose of improving the dyeability thereof, comprising subjecting said shaped articles to the action of a high boiling glycol or glycol ether at an elevated temperature and under substantially anhydrous conditions.

2. The process as defined in claim 1, wherein the glycol or glycol ether is selected from the class consisting of the glycols: ethylene glycol, propylene glycol, diethylene glycol, dipropylene glycol, triethylene glycol, tetraethylene glycol and the mono- and di-lower alkyl ethers of such glycols.

3. The process as defined in claim 2, wherein the mono- and di-lower alkyl ethers are the methyl ethers.

4. A process as defined in claim 1, wherein the temperature of treatment is from about 140° to 500°F.

* * * * *